(12) United States Patent
Vincent et al.

(10) Patent No.: US 10,341,363 B1
(45) Date of Patent: *Jul. 2, 2019

(54) DYNAMICALLY REMOTE TUNING OF A MALWARE CONTENT DETECTION SYSTEM

(71) Applicant: FireEye, Inc., Milpitas, CA (US)

(72) Inventors: Michael Vincent, Sunnyvale, CA (US); Emmanuel Thioux, Santa Cruz, CA (US); Sai Vashisht, Union City, CA (US); Darien Kindlund, Great Falls, VA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,765

(22) Filed: Dec. 28, 2015

Related U.S. Application Data

(63) Continuation of application No. 14/231,216, filed on Mar. 31, 2014, now Pat. No. 9,223,972.

(51) Int. Cl.
*G06F 21/00* (2013.01)
*H04L 29/06* (2006.01)

(52) U.S. Cl.
CPC ...... *H04L 63/1416* (2013.01); *H04L 63/1425* (2013.01); *H04L 63/20* (2013.01)

(58) Field of Classification Search
CPC combination set(s) only.
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,440,723 | A | 8/1995 | Arnold et al. |
| 5,490,249 | A | 2/1996 | Miller |
| 5,657,473 | A | 8/1997 | Killean et al. |
| 5,842,002 | A | 11/1998 | Schnurer et al. |
| 5,978,917 | A | 11/1999 | Chi |
| 6,088,803 | A | 7/2000 | Tso et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Marchette, David J., "Computer Intrusion Detection and Network Monitoring: A Statistical Viewpoint", ("Marchette"), (2001).

(Continued)

*Primary Examiner* — Ghazal B Shehni
(74) *Attorney, Agent, or Firm* — Rutan & Tucker, LLP

(57) ABSTRACT

According to one embodiment, an apparatus comprises a processor and memory. Communicatively coupled to the processor, the memory includes a detection module that, when executed, conducts an analysis of a received object to determine if the received object is associated with a malicious attack. The detection module is configurable, and thus, certain capabilities can be enabled, disabled or modified. The analysis is to be altered upon receipt of a configuration file that includes information to alter one or more rules controlling the analysis conducted by the detection module.

21 Claims, 7 Drawing Sheets

(56) References Cited

U.S. PATENT DOCUMENTS

| | | |
|---|---|---|
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |

(56) References Cited

U.S. PATENT DOCUMENTS

| | | |
|---|---|---|
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |

(56) References Cited

U.S. PATENT DOCUMENTS

| | | |
|---|---|---|
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0294744 A1* | 12/2007 | Alessio ............... H04L 63/1425 726/1 |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0054278 A1 | 3/2010 | Stolfo et al. |
| 2010/0115621 A1 | 5/2010 | Staniford et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0241974 A1* | 9/2010 | Rubin ................... G06F 21/554 715/764 |
| 2010/0281541 A1 | 11/2010 | Stolfo et al. |
| 2010/0281542 A1 | 11/2010 | Stolfo et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |

(56) References Cited

U.S. PATENT DOCUMENTS

| | | |
|---|---|---|
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0115654 A1* | 4/2014 | Rogers ............... H04L 63/0218 726/1 |
| 2014/0130158 A1 | 5/2014 | Wang et al. |
| 2014/0137180 A1* | 5/2014 | Lukacs ............... G06F 21/53 726/1 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 02/23805 A2 | 3/2002 |
| WO | 02/006928 A2 | 8/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2013/067505 A1 | 5/2013 |

OTHER PUBLICATIONS

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J. , et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Spitzner, Lance , "Honeypots: Tracking Hackers", ("Spizner"), (Sep. 17, 2002).

The Sniffers's Guide to Raw Traffic available at: yuba.stanford. edu/.about.casado/pcap/section1.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Appl. No. 14/231,216, filed Mar. 31, 2014 Non-Final Office action dated Jun. 15, 2015.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul , "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

(56) References Cited

OTHER PUBLICATIONS

Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Adobe Systems Incorporated, "PDF 32000-1:2008, Document management—Portable document format—Part1:PDF 1.7", First Edition, Jul. 1, 2008, 756 pages.
AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Dohen, M.I. , "PyFlag—An advanced network forensic framework", Digital investigation 5, Elsevier, (2008), pp. S112- S120.

Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.

(56) References Cited

OTHER PUBLICATIONS

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

\* cited by examiner

DYNAMICALLY REMOTE TUNING OF A MALWARE CONTENT DETECTION SYSTEM

CROSS-REFERENCE TO RELATED APPLICATIONS

This application is a continuation of U.S. patent application Ser. No. 14/231,216, filed Mar. 31, 2014, the entire contents of which are incorporated herein by reference.

FIELD

Embodiments of the disclosure relate to the field of cyber security. More specifically, one embodiment of the disclosure relates to a system and method for increasing the accuracy in detecting objects under analysis that are associated with a malicious attack and enhancing classification efficiency by reducing errors in the form of false positive and/or false negatives.

BACKGROUND

Over the last decade or so, malicious software (commonly referred to as "malware") has become a pervasive problem for electronic devices in communication over a network. In general, malware is computer code that may execute an exploit, namely information that attempts to take advantage of a vulnerability in software running on a targeted computer in order to adversely influence or attack normal operations of that computer. For instance, an exploit may be adapted to take advantage of a vulnerability in order to either co-opt operation of a computer or misappropriate, modify or delete data stored within the computer.

More specifically, malicious network content is a type of malware that may be distributed over a network, such as malware hosted by a website being one or more servers operating on a network according to a hypertext transfer protocol (HTTP) standard or other well-known standard. For instance, malicious network content may be actively downloaded and installed on a computer, without the approval or knowledge of its user, simply by the computer accessing the malicious website. As an illustrative embodiment, the malicious network content may be embedded within objects associated with web pages hosted by the malicious website or may enter a computer upon receipt or opening of an electronic mail (email) message. For example, an email message may contain an attachment, such as a Portable Document Format (PDF) file, with embedded malicious executable programs.

Various processes and appliances have been employed to detect the presence of malicious network content on a computer. For instance, a two-phase malware detection appliance currently exists for detecting malware contained in network traffic. However, both phases (static and dynamic) conducted by this conventional malware detection appliance rely heavily on hard-coded rules to control their operations. More specifically, conventional malware detection appliances may include a "factory installed" operating system (OS) software image along with a corresponding release of a software image package for use in the dynamic phase. The software image package includes logical monitors for a virtual run-time environment in the dynamic phase. In the event of the customer-installed malware detection appliance experiencing significant incidences, such as a high rate of false positives or false negatives in malware detection for example, customers may be provided with a new version of the OS software image or a new version of the software image package. However, such releases are slow to fruition, normally taking 4-6 months (including development and quality assurance testing). Moreover, the new software image package may still not be tuned to threats (e.g., Advanced Persistent Threats "APT attacks") that target specific IT resources at a specific customer (enterprise or agency), and may be days or weeks behind malware "developments" (e.g., introduced by malware authors or self-generated by polymorphic malware) as experienced by customers.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1A:
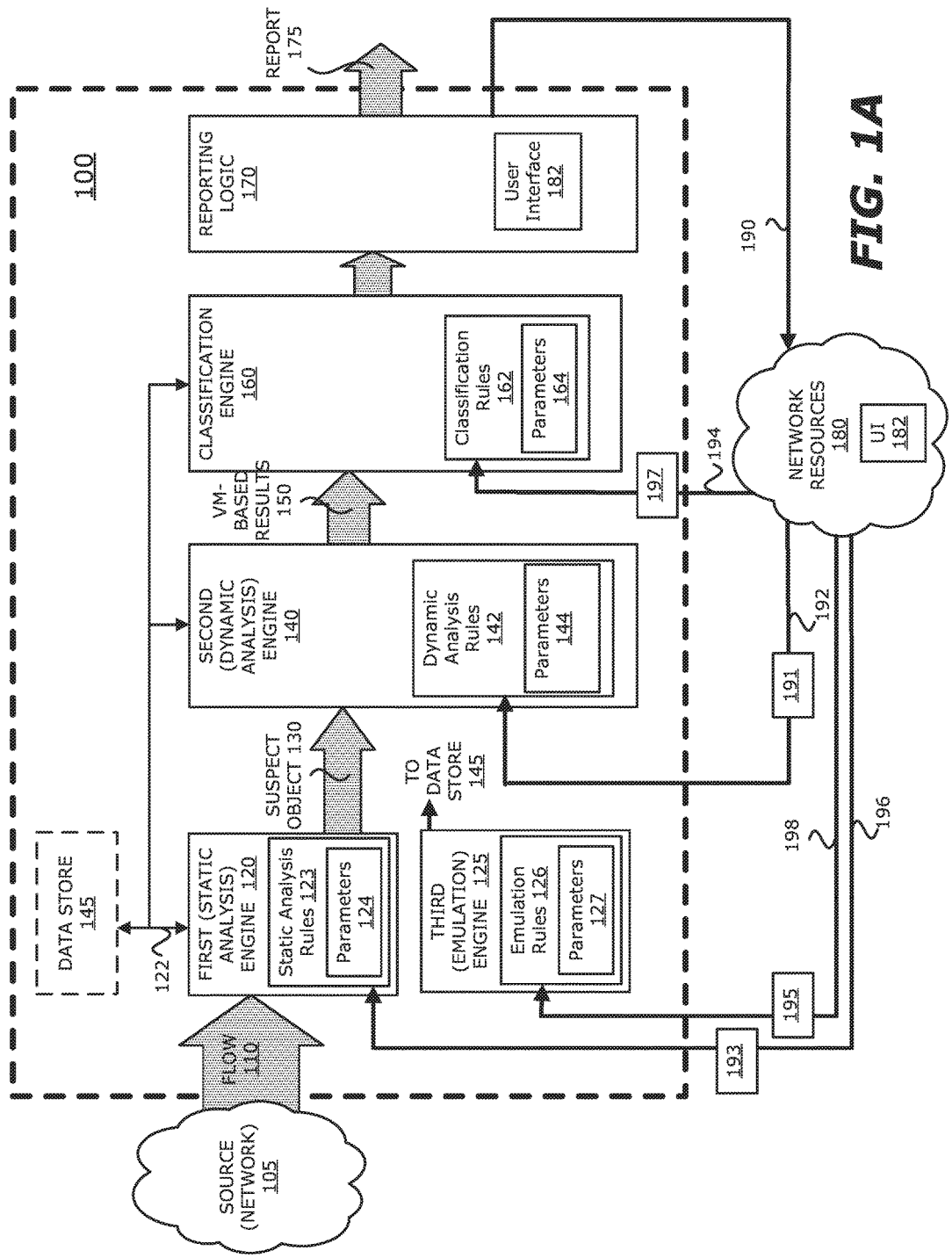
FIG. 1A is an exemplary block diagram illustrating a malware content detection system according to a first embodiment of the disclosure utilizing network-based update (communication) paths.

Various embodiments and aspects of the disclosure will be described with reference to details discussed below, and the accompanying drawings will illustrate the various embodiments. The following description and drawings are illustrative and should not be construed as limiting the invention. While specific details are described to provide a thorough understanding of various embodiments of the disclosure, in certain instances, well-known or conventional details are not described in order to provide a more concise discussion.

I. Detailed Summary

Embodiments of the disclosure disclose generation and release of a "fully parameterized" version of image software that controls operations of one or more engines within a malware detection appliance (referred to as "malicious content detection (MCD) system"), where, from time to time, values of selected parameters of the image software may be enabled, disabled or changed to "tune" the MCD system. The term "fully parameterized" identifies software that includes parameters intended by the software developer to be changed, perhaps in real-time after deployment, based on changes to data within a configuration file.

According to one embodiment of the disclosure, a "configuration file" refers broadly to an item containing data specifying or representing parameter values in a structured or unstructured format. The parameter values may be used to define variables, constants, conditions, lists (or portions thereof), tables (or portions thereof), templates (or portions thereof) and other data sets that can be referenced and used by one or more processes of the detection engines (e.g., dynamic analysis engine, static analysis engine, emulation engine, and/or classification engine). The parameter values are used to change or control one or more operations and functions (capabilities) performed by the processes.

In another embodiment, a "configuration file" refers broadly to an object containing data specifying or representing both parameter values, as described above, and operation rules. Operation rules may be any logical engines in their respective operations as part of the MCD system and may be used by (and tune) the operation(s) of a corresponding engine. The operation rules may be used (e.g., executed or otherwise processed), for example, in implementing any and all heuristic, deterministic, inference, correlation logic, or the like, utilized by those engines. Further examples of more practical import for the use of operation rules in detection and classification of content as malware are given elsewhere in this specification.

The parameter values may be associated with one or more operation rules, where the rule or rules may be contained, depending on the embodiment, within the configuration file or hard-coded within the processes or other logic of the detection engines. The parameter values may change or control (tune) the associated rules, including their applicability and action/effect with respect to the operation(s). To this end, in some embodiments, the engines (and/or computer programs that, when executed, implement aspects of the engines) may be specifically designed and developed in such manner as to reference parameters which, during run-time, assume values specified by the contents of the configuration file. This may be referred to as "parameterized". "Fully parameterized" describes detection engines that are optimized during the design and development process to obtain a maximum level of flexibility for later configuration and tuning through use of a configuration file as described herein. Such optimization should take into account and balance practical considerations including risks and benefits with respect to operational aspects of the engines that are best modified through an update to a configuration file or via a new "factory" originating, formal release of a software image package.

Rendering the MCD system more efficacious at malware detection in light of recently detected/evolved malware and improving overall performance, the tuning of selected parameters of the software image may be accomplished by a download of a software image update in the form of the configuration file. According to one embodiment of the disclosure, the configuration file is configured to tune one or more detection engines, including a static analysis engine, an emulation engine, a dynamic analysis engine, and/or a classification engine set forth in FIGS. 1A-1B. The downloading of the configuration file may be handled from a factory (or authorized software distributor) or the configuration file may be provided or modified by the customer (or its IT or security provider). For the later tuning scheme, a customer representative may enter changes to the configuration file through a user interface in order to tune one or more of the above-identified engines to better thwart threats (e.g., APT attacks) that may specifically target the customer or its industry, or otherwise address the customer's special security concerns.

As described below, the configuration file can be loaded into a targeted detection engine or engines to change/control its operation (how it functions), and thus tune/configure the detection engine(s) or even customize the detection engine. Changes to the contents of the configuration file (e.g., the parameter values contained therein) may enable or disable certain features (e.g., capabilities) of the MCD system, or may modify its capabilities so that one capability is dependent on another.

For instance, the software image may support W (X+Y+Z) capabilities, where a first subset ("X") of capabilities (e.g., X≥3, X=80) may be always enabled to provide the foundational operation of the MCD system. Similarly, a second subset ("Y") of capabilities (e.g., Y≥1, Y=15) may be turned on or off by modifying the configuration file, and optionally, a third subset ("Z") of capabilities (e.g., Z≥1, Z=5) may be experimental to test, for example, new capabilities that may impact detection efficacy or performance when enabled or disabled within the customer's deployment. Herein, for this example, the fully parameterized software image includes parameters to "tune" (i) all of the second subset of capabilities; (ii) optionally, all of the third subset of capabilities; and (iii) potentially, depending on developer preferences, at least some of the first subset of capabilities.

Based on dynamic tuning of the MCD system, the response time for addressing identified significant incidences though software changes for the detection engines is reduced from months to days or even hours. Additionally, dynamic tuning, as described herein, eliminates the need for extremely high bandwidth requirements associated with downloading a software image package since the configuration file may be a small fraction of its size.

More specifically, embodiments of the disclosure reside in techniques for configuring (tuning) a malicious content detection (MCD) system through the configuration file by adjusting parameters and/or operation rules controlling the operations of logic responsible for the analysis of incoming objects to determine whether such objects are associated with a malicious attack. The parameter change and/or operation rule adjustment customizes the MCD system for enhanced detection and classification efficiency in order to reduce false positives and/or false negatives.

According to one embodiment of the disclosure, the MCD system includes a plurality of configurable detection engines, including a configurable dynamic analysis engine (e.g., virtual execution logic with one or more virtual machines "VMs" for processing objects under analysis) and a configurable classification engine operable in response to observed behaviors within the dynamic analysis engine for classifying an object under analysis as malware or benign. The configurable detection engines are part of fully parameterized software uploaded into the MCD system at installation.

Figure 1B:
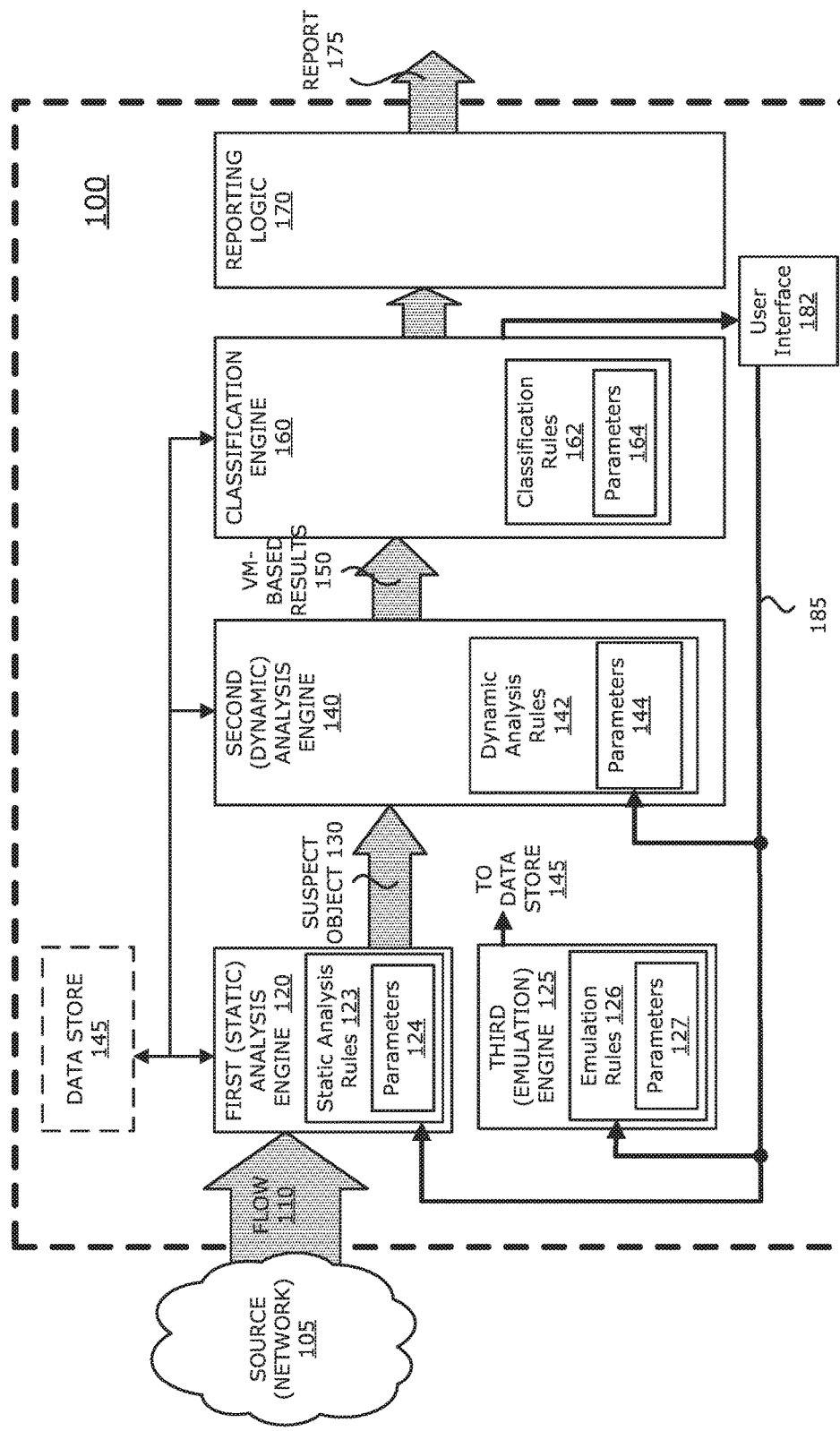
FIG. 1B is an exemplary block diagram illustrating a malware content detection system according to a second embodiment of the disclosure utilizing local update (communication) paths.

These detection engines are at least partially controlled by parameters and/or operation rules that are configurable via the configuration file through network-based update paths 190, 192, 194, 196 and 198 of FIG. 1A or local update paths 185 as shown in FIG. 1B. The network-based update paths enable updating through a management system automatically or manually through a user interface (UI) in order to receive a configuration file from a remotely located source (e.g., factory, authorized software distributor, off-site network administrator, etc.) while the local update paths 185 enable updating locally by a customer (or its IT or security provider). The updates may be conducted on a subscription basis.

In particular, the MCD system may be configured (tuned) in real-time by loading a configuration file into one or more of the detection engines in order to alter one or more parameters and/or operation rules associated with a dynamic analysis rule and perhaps change certain capabilities of the MCD system. The altering of one or more parameters (herein, "parameter(s)") may be used to effectively add a new dynamic analysis rule (by setting certain parameters associated with a pre-loaded rule or setting a parameter that commences compliance with the rule during dynamic analysis), disable a dynamic analysis rule (by clearing parameters associated with a pre-loaded rule or setting a parameter to disable compliance with the rule), or modify (update) a dynamic analysis rule (by activating and/or deactivating one or more parameters associated with a pre-loaded rule) so as to effectuate a change in operation. Additionally, besides adjusting parameters associated with a pre-existing rule for the detection engine, it is contemplated that information associated with a new rule may be uploaded. Hence, alteration of an operation rule may be conducted by adding data for an entire rule or adding, disabling or modifying one or more parameters associated with a pre-existing rule.

Additionally, it is contemplated that, as an alternative or an addition to a configurable dynamic analysis engine, the MCD system may further include a configurable static analysis engine and/or a configurable emulation engine. Parameters associated with rules controlling the operations of these detection engines may be altered in real-time or new rules may be uploaded or modified, as described above.

It is contemplated that, according to one embodiment of the disclosure, a dynamic analysis rule may specify a particular type of monitor (e.g., logical component to monitor behaviors, a physical component to monitor behaviors, etc.) and one or more corresponding parameters may be configured to alter the number or types of monitors that are in operation (enabled) within a VM of the dynamic analysis engine. Another example of a dynamic analysis rule may be an operation rule that specifies a particular type, pattern or combination of observed behaviors that are associated with a malicious attack and therefore lead to classifications of suspect objects as malware. One example of a classification rule may be associated with a threshold computing scheme where certain parameters provided by a configuration file are used to adjust weighting of scores provided from the static analysis engine, emulation engine, and/or the dynamic analysis engine. These types of operation rules, for monitoring and for classification for example, may be interdependent and coordinated by parameters from the configuration file to enhance detection and classification efficiency.

Rule generation may involve a human guided learning or machine learning. The machine learning protocols may be designed to provide effective monitoring arrangements to observe behaviors during dynamic processing (in a virtual environment) of known malware and non-malware samples. This approach may identify monitored behaviors or patterns/combinations of behaviors with a high correlation to malware. The initial operation rules and/or values for parameters selected for the rules may be based, at least in part, on metadata of suspicious traffic that specifies context for the suspect object, such as its file type (e.g., Word® document, PDF document, Flash, executable), operating system type and version, application type and version, etc. Using the configuration file, parameters (or perhaps rules themselves) may be "pushed" or otherwise provided to the MCD system through a management system such as a private network management system, a central management system (e.g., cloud management system or local management system), or locally via a user interface (UI) of the MCD system.

It may be useful to describe specific, practical examples of use of the configuration file to control/adjust operation of the MCD system. Embodiments of the disclosure apply a "configuration" to executable software components of the MCD system. For instance, the dynamic analysis engine may be configured to intercept or "hook" system calls, Application Programming Interfaces (APIs), and other points of interaction between processes running within the dynamic analysis engine. This configuration may be "tuned" by modifying parameters associated with particular rules in order to intercept only a subset of these points of interaction that may be associated with, for example, certain known types of prevalent malware, certain known prevalent families of malware, etc.

As an example, an enterprise may have experienced an APT attack characterized by certain types of exploits, and parameter values may be provided to better tune (configure) the dynamic analysis engine to detect behaviors associated with such exploits. More specifically, the APT actor may target a specific domain name, user name, IP address, or subnet address, or may seek a specific file type (e.g., Excel file). The management system may provide a user interface to allow the customer to "insert" (e.g., in an appropriate interactive field) specific values for the above names, addresses or file types, and these values can be stored in the configuration file and read into the appropriate engine(s) to customize its operation to the needs/concerns of the customer. This "template", which refers to an IT/cyber-security organization's view of a set of parameters suitable to thwart an APT attack, including both general parameters (directed to general characteristics and general behaviors common to APT actors) plus user specified parameters (directed to certain APT malware or families of APT malware that target a particular resource and other parameters may control weighting of both those characteristics/behaviors for purposes of scoring).

In some embodiments of the disclosure, the classification engine may also apply operation rules included in the content updates to find correlations between the points of interaction and, for example, the prevalent or (in other situations) newly discovered malicious behavior. The malware classification may be based on context-specific classification rules and/or parameters utilized by the classification rules associated with a particular object under analysis.

When identified through the learning processes described above, parameter values for establishing new rules or modifying existing rules can be pushed to the dynamic analysis engine (and/or the static analysis engine and/or emulation engine) from a management system. Because these lightweight updates consist of rules (e.g., complete rules or portions of rules such as parameter values) instead of complete update software images, the size of the necessary update is reduced, and may occur more frequently to more quickly respond to new threats.

In some embodiments of this disclosure, light-weight updates through downloading of a configuration file via local update paths or network-based update paths may be used to provide customization of the detection engines (e.g., dynamic analysis engine, static analysis engine, and/or emulation engine) and/or provide updates the MCD system in an agile fail-safe manner. These updates may place logic within the MCD system into a new operating state or conduct a rollback operation to return the logic to a former operating state. Hence, different features of the detection engines may be configurable via this update mechanism. Regarding customization as an illustrative case, a "security centric" customer may wish to sacrifice system throughput for additional detection efficacy resulting from a more exhaustive detection engine posture. With regard to update management of the MCD system, the use of light-weight configuration files may enable the MCD system to meet stringent customer service-level agreements, which dictate the mandated response to detecting/fixing/updating of reported issues/ software defects within time, bandwidth or other constraints for which a new release or patch would not be practical or possible.

There are many methods for an attacker to upload malicious code into programs running on a client device. From a detection perspective, multiple rules or methods may be employed to capture this behavioral attack. It is envisioned any operation rule may have a few unknown cases which may result in false positives and/or false negatives. Hence, in many situations, it is advantageous to "tune" operation rules (through rule additions, disablements, or modifications) in order to improve filtering of malicious/benign objects during dynamic analysis instead of relying on filtering at a later stage in the classification engine. For instance, increased (or targeted) filtering inside of the dynamic analysis engine may produce more effective operation rules thereby eliminating the passing of superfluous information, sometimes referred to as "noise", downstream to correlation engine and improve accuracy of object classification at the correlation engine.

Additionally, light-weight content based updates in the form of a configuration file are useful to the creation of a robust release scheme for altering operation rules and other features of the MCD system automatically or manually through the management system. Given the ability through human interaction, machine learning, and/or auto-generation of the detection and classification features of the detection engines may be dynamically updated—tuned. With the update mechanics in place, changes in malware detection features may be release at a more rapid pace, then validated and tuned in the field. As a result, features of the detection engines may be disabled, enabled, or used to activate more expansive malware detection capabilities (e.g. apply more resources if increased functionality is desired). In another illustrative case, malware detection features of the detection engines may be tuned with respect to client device type or overall platform deployment. For example, a deployment of any email security platform may enable certain features in a "Security Centric" posture that would typically not be enabled.

Exemplary embodiments may include configuring the dynamic analysis engine to hook specific types of system calls (e.g., system calls to particular APIs (e.g., calls to Sleep( ) function, etc.), and configuring the classification engine to associate a rule-specified pattern of system calls to particular APIs (e.g., calls to Sleep( ) function, etc.), as associated with malware. An operation rule would be created for that pattern and pushed to any detection engine such as the dynamic analysis engine, the static analysis engine, and/or the emulation engine.

Yet another exemplary embodiment may include configuring the classification engine by modifying parameter values associated with the thresholds against which dynamic analysis scores, static analysis scores and/or emulation scores are compared. Also, the content updates may adjust the operating state of the prioritization logic and/or score determination logic in the classification engine to assign certain malicious behaviors (identified through the rules) a greater weight in the identification of the suspect object as malicious.

The configuration of the static analysis engine as well as the emulation engine may be accomplished in a similar fashion as described above. For example, blacklists or whitelists of known malicious websites and non-malicious websites, respectively, may be used for matching sources (URLs) of incoming traffic being examined by a static analysis engine. These exclusion and inclusion lists may be readily updated with new entries or existing entries may be removed through configuration file parameter values specifying the URLs.

II. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor; one or more processor cores; a programmable gate array; a microcontroller; an application specific integrated circuit; receiver, transmitter and/or transceiver circuitry; semiconductor memory; or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, such as a group of related packets, normally having a logical structure or organization that enables classification for purposes of analysis. For instance, an object may be a self-contained element, where different types of such objects may include an executable file, non-executable file (such as a document or a dynamically link library), a Portable Document Format (PDF) file, a JavaScript™ file, Zip™ file, a Flash file, a document (for example, a Microsoft Office® document), an email, downloaded web page, an instant messaging element in accordance with Session Initiation Protocol (SIP) or another messaging protocol, or the like.

The term "flow" generally refers to a collection of related objects, normally communicated during a single communication session (e.g., Transport Control Protocol "TCP" session) between a source (e.g., client device) and a destination (e.g., server).

A "message" generally refers to information transmitted as information in a prescribed format, where each message may be in the form of one or more packets or frames, or any other series of bits having the prescribed format.

The term "transmission medium" is a physical or logical communication path with a client device, which is an electronic device with data processing and/or network connectivity such as, for example, a stationary or portable computer including a desktop computer, laptop, electronic reader, netbook or tablet; a smart phone; server; mainframe; signal propagation electronics (e.g. router, switch, access point, base station, etc.); video game console; or wearable technology. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the term "verified" are used herein to represent that there is a prescribed level of confidence (or probability) on the presence of an exploit within an object under analysis. An "exploit" may be generally construed as information (e.g., executable code, data, command(s), etc.) that attempts to take advantage of a vulnerability, such as a coding error or artifact in software (e.g., computer program) that allows an attacker to alter legitimate control flow during processing of the software by an electronic device. The altering of legitimate control flow may cause the electronic device to experience anomalous (e.g. undesirable, unexpected, irregular, etc.) behaviors.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Techniques for configuring (tuning) a malicious content detection (MCD) system through real-time adjustment of operation rules and/or parameters in order to enhance detection and increase the accuracy in classification of malicious and benign objects are described herein. According to one embodiment, as shown in FIG. 1A, a MCD system 100 includes, but is not limited to, a first detection engine 120 (e.g., a static analysis engine), a second detection engine 140 (e.g., a dynamic analysis engine), a classification engine 160, and reporting logic 170. Optionally, the MCD system 110 may further include a third detection engine 125 in addition to or as an alternative to first detection engine 120 and/or second detection engine 140.

In response to receiving a flow 110 from a source 105 (e.g., network), where the flow 110 may include one or more objects to be analyzed, a determination is made by the first detection engine 120 and/or a second detection engine 140 as to whether one or more objects (hereinafter, "object(s)") within the flow 110 should be classified as malicious. In other words, the objects are analyzed to determine whether they are part of a malicious attack. Herein, the object(s) may be information within the flow 110 (or flow 110 itself), which is part of the network traffic traveling over a transmission medium of a network (e.g., a wired or wireless local area network, a wide area network, etc.) that is captured by the MCD system 100 or an intermediary device such as a network interface. Alternatively, the object(s) may be manually submitted to the MCD system 100 via a user interface (UI) 182 (e.g., a Web portal), which is illustrated as part of the reporting logic 170 and/or network resources 180 in FIG. 1A.

A "malicious attack" may be defined as any operation or operations that are performed on an electronic device, at least initially unbeknownst to its user, in order to (1) alter control of the electronic device where the change in control is unwanted or unintended by the user and/or (2) gain access to stored information or information that is available to the user. As an illustrative example, a malicious attack may include one or more attack stages. For instance, a first attack stage may involve a reconnaissance stage in which information about the software and system logic associated with one or more targeted client devices is sought. This information may be used subsequently in other attack stages. Additionally or in the alternative, the malicious attack may include (1) an attack stage that involves "testing" for an initial attack or entry-point on a single client device or multiple client devices as the target and/or (2) an attack stage for delivery of an exploit such as a malicious attachment in an email message. Of course, the attack stage for delivery of the exploit may be in a variety of forms such as a phish attack where an attempt is made to capture credentials (which constitute the whole attack, or which are to be used later for part of another attack), a browser based exploit attack which attempts to get malicious code to run via a hostile web-site, or the like.

Where the malicious attack involves delivery of an exploit, once the attacker's malicious code is running on the client device(s), the attacker can pivot in many different directions. The malicious attack may attempt to disable or neutralize security software. This is important from a detection perspective in that the real attack may only come to the system after the security software has been disabled or neutralized. Now, upon infiltrating the targeted client device (s), the exploit may perform many different types of attacks and compromise the client device, such as download additional malicious information, unknowingly or unwantedly connect to a network, conduct lateral movements throughout the targeted client device(s) in an attempt to find and compromise other systems of interest. These stages of the malicious attack may involve updates to the malicious binaries, exfiltration, and/or using the compromised system as part of an attack, or as part of another attack.

As an illustrative example, the end goal of the "malicious attack" may be directed to data theft. This could involve taking over the user's web-browser, capturing keystrokes, and/or capturing the on-screen content for later processing once exfiltrated from the targeted client device. These types of attacks may target online banking or online commerce user activities. The capture of user login credentials is another related case. As part of a "malicious attack," the attacker may capture login credentials for another targeted electronic device. Subsequently, the same or a different malicious attack may use these captured credentials to attack other targeted electronic devices.

Another example includes cases of ransom-ware and a Denial-of-Service (DOS) attack. Typically, a ransom-ware type of attack attempts to hold the target machine hostage until the user makes a financial transaction or other behavior desired from the attacker. In the case of a DOS attack, the attacker may take over the target client device with the intent of using this target client device as part of the DOS attack. These attacks may involve one or more stages.

Herein, according to one embodiment of the disclosure, the static analysis engine 120 may be responsible for performing a static analysis on the object(s) within the flow 110 without executing or playing such object(s). This "static analysis" may include, but is not limited or restricted to signature matching, heuristics, protocol semantics anomalies checking, determinative rule-based analysis, source reputation checking, blacklist or whitelist checking, or the like. Upon conducting a static analysis on the object(s) within the flow 110, the static analysis engine 120 determines whether any object is deemed "suspect" (or "suspicious"), namely the object exhibits characteristics associated with a malicious attack, such as characteristics associated with a particular exploit. The suspect object 130 is provided to the dynamic analysis engine 140.

In one embodiment, objects within the flow 110 are statically inspected by the static analysis engine 120 for various characteristics. These characteristics are intended to be signals as to the "goodness" and "badness" of the objects under analysis. For example, if a file contains a Microsoft® Excel® icon as its own display icon, this may "look" suspicious since that is a common malware technique to trick a user into opening the file. Subsequently, the file is dynamically analyzed by dynamic analysis engine 140 for anomalous behaviors (e.g., actions or even omissions during virtual processing that are anomalous). For instance, it may be discovered that the file may not be opened by a Windows® Office application and/or may exhibit other anomalous behaviors (e.g., initiate a callback, accessing resources atypical of normal Excel® operations, etc.) that are not expected from an Excel® file.

Furthermore, the static analysis engine 120 may generate a static analysis score representing the likelihood that the suspect object 130 is malicious based on the static analysis. The static analysis score and/or other results from the static analysis (hereinafter "static analysis results" 122) may be provided to classification engine 160 for classification of a suspect object (see FIG. 2A). Additionally or in the alternative, the static analysis results 122 may be stored in a data store 145. The static analysis and/or generation of the static analysis score may be controlled by static analysis rules 123 and parameters 124 associated with the static analysis rules 123.

According to another embodiment of the disclosure, the static analysis engine 120 may not be deployed within the MCD system 100 so that the flow 110 propagates directly to the dynamic analysis engine 140 or, based on the security settings, certain flows may be directed to the static analysis engine 120 while other flows may be directed to the dynamic analysis engine 140 without any processing by the static analysis engine 120.

As further shown in FIG. 1A, the dynamic analysis engine 140 may be configured to perform a dynamic analysis on the suspect object 130, including monitoring behaviors of the suspect object 130 during its virtual execution (using one or more virtual machines "VMs") to detect any anomalous behaviors. More specifically, the dynamic analysis engine 140 is configured to monitor the behaviors of the subject object 130 in an operating environment (e.g., VM) and generate dynamic analysis (VM-based) results 150. The VM-based results 150 may include a dynamic analysis score and/or other information describing or indicating the anomalous and/or expected behaviors observed during the dynamic analysis. The "dynamic analysis score" represents a likelihood that the suspect object 130 is malicious based on the dynamic analysis, which may be in a form of a measure of probability.

The VM-based results 150 are provided to the classification engine 160 for use in classifying the suspect object 130, such as a malicious or benign classification. Additionally or in the alternative, the VM-based results 150 may be stored in the data store 145.

The virtual execution of the suspect object 130, the monitoring of behaviors during VM-based processing of the suspect object 130 and/or the generation of the dynamic analysis score may be controlled by dynamic analysis rules 142 and/or parameters 144 associated with the dynamic analysis rules 142.

According to one embodiment of the disclosure, at least portions of the static analysis results 122 and/or VM-based results 150 may be provided as feedback 190 returned to network resources 180. Based on analysis of the feedback 190 automatically or manually through use of the UI 182, where the analysis may be in accordance with machine learning or human guided learning analysis schemes, forensics or another type of analysis scheme a security software developer or, in an automated implementation, network resources 180 (e.g., a server, a management system, etc.) may generate a configuration file 191 included as part of a first set (e.g., one or more) of messages routed over update path 192. The configuration file 191 may be adapted, e.g., to modify one or more parameters 144 that are used by dynamic analysis rules 142 in order to effectively add one or more new rules, modify one or more existing rules, or disable one or more existing rules.

Similar to the discussion above, based on static analysis results 122 (FIG. 2A) and/or VM-based results 150, and other malware analysis, a security software developer may generate (or network resources 180 may be configured to generate) a configuration file 193 included as part of a second set of messages routed over update path 196. The configuration file 193 may be used to add, modify and/or disable static analysis rules 123 through content updates (e.g., updates to rule 123 and/or parameters 124).

As optional logic, the emulation engine 125 may be configured to emulate operations associated with the processing of a particular object within flow 110 in context with an emulated computer application (rather than a "real" application, as may be run in a VM in the dynamic analysis engine 140) or in context with an emulated dynamic library. As an optional implementation, the emulation engine 125 may provide the list of functions or characteristics on which malware checks can be applied in later analyses, and/or information regarding a suitable operating environment to be employed in one of the VMs for the dynamic analysis engine 140. For example, the emulation engine 125 may identify a particular version of an application having a vulnerability targeting a particular object, and the dynamic analysis engine 140 will then employ that particular version of the application within the virtual environment. This may lead to additional or different monitors being activated within the dynamic analysis engine 140 in order to monitor for certain types of behaviors.

More specifically, the emulation engine 125 may be configured to emulate operations of the particular object and also monitor for anomalous behavior. For instance, the monitoring may be accomplished by "hooking" certain functions associated with that object (e.g., one or more API calls, etc.), and controlling what data is specifically returned in response to corresponding function calls (e.g., force return of an application version number different than its actual number). After receipt of the returned data, operations by the object are monitored. For instance, the output from the "hooked" object may be analyzed to determine if a portion of the output matches any of signature patterns or other types of malware identifiers. The emulation may be controlled by emulation rules 126 and/or parameters 127 associated with the emulation rules 126.

Similar to the discussion above, based on results 128 from emulation engine 125 (FIG. 2A) and/or VM-based results 150, a security software developer may generate (or network resources 180 may be configured to generate) a configuration file 195 included as part of a third set of messages routed over update path 198. The configuration file 195 may be used to add, modify and/or disable emulation rules 126 through content updates (e.g., updates to rules 126 and/or parameters 127).

Classification engine 160 is to classify whether the suspect object 130 is likely malicious based on results from the dynamic analysis engine 140, the static analysis engine 120 and/or the emulation engine 125. More specifically, according to one embodiment of the disclosure, the classification engine 160 ("classifier") may use the static analysis score within the static analysis results 122 and the dynamic analysis score with the VM-based results 150 to determine a classification that identifies whether the suspect object 130 is malicious, non-malicious, or uncertain. The classification may be provided to the reporting logic 170, which is responsible for generating information (e.g., an alarm (warning) message, a report, etc.) that indicates whether or not the suspect object 130 is likely malware. The classifier may be in a form of confidence score. Additionally, the classification engine 160 may be responsible for generating an indicator or signature for classified malware, which may be used by the MCD system 100 (or other MCD systems) to block subsequently received objects that match the signature.

The operations of classification engine 160 are controlled by classification rules 162 and parameters 164 associated with the classification rules 162. In response to the monitored behaviors, the feedback 190 may be returned to the network resources 180, which causes a configuration file 197 included as part of a fourth set of messages over update path 196 that may be used to modify one or more parameters 164 that are used by classification rules 162. Additionally or in the alternative, the configuration file 197 may be used to install one or more new rules to classification rules 162, modify one or more existing classification rules 162, or delete one or more of the classification rules 162.

Of course, in lieu of generating a separate configuration file 191, 193, 195 and 197 targeted for a specific detection engine 120, 125, 140 or 160, it is contemplated that a single configuration file may be generated and/or distributed by the security software developer or network resources 180. This configuration file may be routed to all or some of these detection engines.

According to one embodiment of the disclosure, information within the VM-based results 150 and/or static analysis results (and/or results from operations on emulation engine 125) is used as feedback 190 that is, in turn, used by the network resources 180 in an automated setting (or updated via UI 182 in a manual setting) to adjust the parameters associated with the rules controlling the capabilities of the respective detection engine. This adjustment is designed to tune the analysis conducted on subsequent objects in order to reduce false positives and/or false negatives, and thus, improve efficiency and accuracy in subsequent analysis.

Although not shown, it is contemplated that a controller (not shown) may be provided within the MCD system 100 to coordinate operations of the first detection engine 120, the second detection engine 140, the third detection engine 125, and/or a fourth detection engine (e.g., the classification engine) 160. Herein, the controller may be configured to determine an order of analysis, such as the first detection engine 120, followed by the second detection engine 140 and the classification engine 160 in series, as described herein. However, it is contemplated that the order of analysis may be where (a) the first detection engine 120 and the second detection engine 140 operate in parallel followed by the classification engine 160; (b) the first detection engine 120 and the third detection engine 125 operates in parallel, followed by the second detection engine 140 and the classification engine operating in series; (c) the third detection engine 125, the first detection engine 120, the second detection engine 140 and the classification engine operate in series; or the like. Effectively, the controller determines the order of analysis for logic within the MCD system 100.

Although operation rules 123, 126, 142 and/or 162 and their corresponding parameters 124, 127, 144 and/164 are illustrated as being within their respective engines, it is contemplated that the information associated with the rules and/or parameters may be stored in the data store 145 (e.g., a persistent database) that is accessible and used by each of the engines of the MCD system 100 (e.g., static analysis engine 120, emulation engine 125, dynamic analysis engine 140 and/or classification engine 160) during all processing stages of malware detection processes. Each of these logic components may utilize information stored in the data store 145 during their respective processes, where the information stored is obtained during the current malware detection session and prior malware detection sessions (if any), and/or other information received or updated from other information sources, such as external analysis data from a dedicated server or via cloud services (e.g., over the Internet). The information may include rules, parameters, metadata associated with the subject object 130, information concerning the circumstances surrounding the subject object 130 (e.g., environment in which the subject object 130 is received such as email or Web information), information observed or learned during the operations of each of the logic components of the MCD system 100, and/or other information obtained from other MCD systems with respect to the same or similar object. The subject object 130 itself may also be cached in the data store 145.

According to another embodiment of the disclosure, as shown in FIG. 1B, local update paths 185 are provided from the classification engine 160 to other detection engines 120, 125 and 140. The local update paths 185 enable the lightweight configuration file (e.g. operation rules and/or parameters), which are based on the received VM-based results 150, static analysis results 122 (see FIG. 2A) and/or results 128 (see FIG. 2A) from emulation engine 125, to be provided to the detection engines locally in accordance with an automated manner (e.g., controlled by logic residing in the classification engine 160 and/or reporting logic 170 for example) or manually via the UI 182 as shown. As described above, these configuration file may be adapted to adjust the operations and/or capabilities of the dynamic analysis engine 140 (e.g., adjust number of monitors, type of behaviors to be monitored, maximum or minimum time of VM operations, rules for formulating the dynamic analysis score, etc.); adjust the operations and/or capabilities of the static analysis engine 120 (e.g. adjust number or types of signatures for signature matching, adjust types or number of attributes such as selection or de-selection of certain Internet Protocol "IP" or Media Access Control "MAC" addresses from blacklists or whitelists, type of characteristics to be monitored, maximum or minimum time for static analysis of a particular object, rules for formulating the static analysis score, etc.); and/or adjust the operations and/or capabilities of the emulation engine 125 (e.g., adjust which APIs or functions calls to "hook", what data is to be returned in response to corresponding function calls, maximum or minimum time of emulation, etc.). These illustrative examples are not meant to limit the scope of the updates of the rules and/or parameters. Additionally these illustrative examples may apply to more than one of the detection engines.

It is noted that the configurations of MCD system 100 are described and shown in FIGS. 1A and 1B for the purpose of illustration only. More or fewer components or other logic configurations may be implemented. For example, at least some of the functionalities of classification engine 160 may be integrated with dynamic analysis engine 140, or vice versa. Each of the static analysis engine 120, the emulation engine 125, the dynamic analysis engine 140, and the classification engine 160 may maintain a separate communications channel (e.g., inter-process call or API as a feedback channel) for communication with a controller. Alternatively, the static analysis engine 120, the emulation engine 125, the dynamic analysis engine 140, and the classification engine 160 can communicate with each other via the data store 145 by storing communications information in predetermined storage location(s) of the data store 145 that are shared amongst these engines. Each of the static analysis engine 120, the emulation engine 125, the dynamic analysis engine 140, and the classification engine 160 may be implemented in software, hardware, or a combination thereof. For example, at least some of these components may be implemented as machine-readable code that can be executed by a processor in a memory to carry out the functionalities or operations as described above. Data store 145 may be maintained in a non-volatile storage device such as a hard disk or flash memory card.

IV. Exemplary Architectures

Figure 2A:
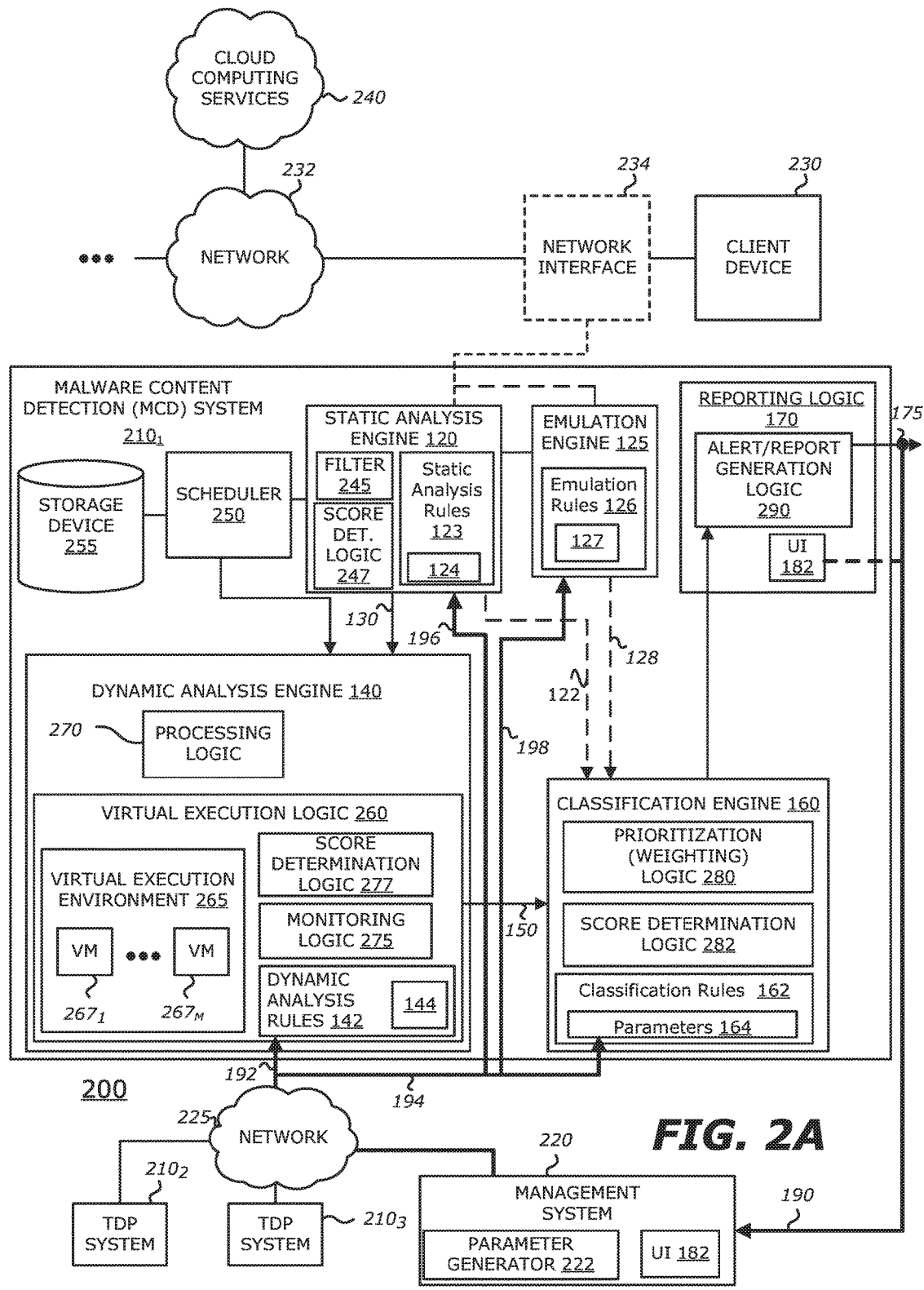
FIG. 2A is a first exemplary block diagram of a communication system deploying a plurality of MCD systems with a framework for detecting a malicious attack based on analysis of a suspect object by a configurable static analysis engine, a configurable dynamic analysis engine and/or a configurable emulation engine.

Referring to FIG. 2A, an exemplary block diagram of a communication system 200 deploying a plurality of MCD systems $210_1$-$210_N$ (N>1, where N=3 for this embodiment and MCD system $210_1$ is equivalent to MCD system 100 of FIG. 1A or 1B) communicatively coupled to a management system 220 via a network 225 is shown. In general, the management system 220 is adapted to manage MCD systems $210_1$-$210_3$. For instance, the management system 220 may be configured to conduct content updates (e.g., upload configuration file with new rules, modify rules, delete rules, and/or modify parameters that are utilized by the rules) within the static analysis engine 120, the emulation engine 125, the dynamic analysis engine 140 and/or the classification engine 160.

Herein, according to one embodiment of the disclosure, the configuration file may be adapted to modify capabilities (e.g., how analysis is conducted, etc.) of the static analysis engine 120, the emulation engine 125, the dynamic analysis engine 140 and/or the classification engine 160. For instance, with respect to the static analysis engine 120, the configuration file may include an operation rule change and/or parameter change which will alter the static analysis from its current operations in determining if an object is "suspect" to warrant a more in-depth analysis. For instance, the operation rule and/or parameter change may alter the number and types of signature patterns or number of reiterations conducted in signature matching. Similarly, with respect to the dynamic analysis engine 140, the configuration file may include an operation rule change and/or parameter change which will alter the dynamic analysis conducted on suspect objects from the static analysis engine 120. For instance, the content updates may specify a particular type or number of monitors within the monitoring logic 275 of the dynamic analysis engine 140 and/or may specify a particular type, pattern or combination of observed behaviors that are associated with certain malicious attacks for heightened observation by the monitoring logic 275 for customizing specific types of malware targeted for detection.

The decision as to the content updates may be based on human guided learning or machine learning upon analysis of certain VM-based results 150 and/or static analysis results 122 that are provided as feedback to management system 220. Such updating may be conducted automatically or conducted manually via uploads by an administrator. Also, such updating may be conducted freely among the MCD systems $210_1$-$210_3$ or subject to a subscription basis.

According to one embodiment of the disclosure, a parameter generator 222 may be configured to use VM-based results 150 and/or static analysis results 122, combined with the rate of false positives and/or false negatives being detected as supplied from another source, to generate a configuration file that has one or more modified parameter values in efforts to reduce the number of false positives and/or false negatives. The rate of false positives is the ratio between the number of suspect objects falsely detected as being malicious and the number of suspect objects under analysis. Conversely, the rate of false negatives is the ratio between the number of objects that were incorrectly determined to be benign and the number of suspect objects under analysis.

The parameter generator 222 may be accessible manually through the UI 182 for manual formulation of the configuration file or may be automated. For the automated process, parameter values within the configuration file may be updated in light of experiential knowledge involving human analysts, machine learning, or other automatic processes not requiring human intervention as described for FIG. 1A above.

As an illustrative example, the dynamic analysis engine 140 may report a heap spray pattern match for a PDF object. Additionally the static analysis engine 120, the emulation engine 125, and/or the dynamic analysis engine 140 may identify the additional attributes about the PDF or additional APIs or libraries loaded when it was opened. Then as part of a feedback loop, the MCD system may suppress reporting of this heap spray pattern or use this pattern plus the other identified attributes to trigger additional dynamic, static, or emulation operations upon subsequent detection of the same or similar pattern. Hence, the MCD system is adjusted to only apply resources (e.g. time/CPU cycles) on a greatly restricted set of targets, in the cases where the additional details are needed to accurately make the false positive (FP) and/or false negative (FN) calculations. Alternatively, rules/parameters may be pushed to the dynamic analysis engine 140 that identify that this heap spray pattern is always malicious and then safely modify the dynamic analysis engine 140 to report more monitored behaviors for this specific case.

Continuing with the heap spray example, detection of a heap spray may be associated with matching a large number (e.g., 20 or 30) memory patterns identified by a corresponding number (a table) of parameter values contained in the configuration file. One or more of the patterns/parameters may be changed to reflect recent discovery of new heap spray patterns. The revised patterns can be used by the dynamic analysis engine 140 or the classification engine 160 for matching of observed behaviors, thus enhancing the respective detection engine's ability to detect/classify an exploit. It is noted that the configuration file is intended to operate as a fast, lightweight, ruled-based updating scheme.

In another example, for time-bombs, adjustments may be made as to timing parameters to adjust virtual system and/or application behaviors to occur at a faster or slower pace. As yet another example, with respect to crashing or early termination objects, adjustments may be made as to which APIs to hook or which calls to modify based on the human intelligence, or machine learning.

As illustrated in FIG. 2A, a first MCD system $210_1$ is an electronic device that is adapted to analyze information associated with network traffic over a communication network 232 from/to one or more client devices 230. The communication network 232 may include a public network such as the Internet, a private network such as a wireless data telecommunication network, wide area network, a type of local area network (LAN), or a combination of networks.

As shown, the first MCD system $210_1$ may be communicatively coupled with the communication network 232 via a network interface 234. In general, the network interface 234 operates as a data capturing device (sometimes referred to as a "tap" or "network tap") that is configured to receive data propagating to/from the client device 230 and provide at least some of this data to the first MCD system $210_1$ or a duplicated copy of the data. Alternatively, as shown in FIG. 2C, the first MCD system $210_1$ may be positioned in-line with client device 230.

According to an embodiment of the disclosure, the network interface 234 may be further configured to capture metadata from network traffic associated with client device 230. According to one embodiment, the metadata may be used, at least in part, to determine protocols, application types and other information that may be used by logic within the first MCD system $210_1$ to determine particular software profile(s). The software profile(s) are used for selecting and/or configuring a run-time environment in one or more virtual machines selected or configured as part of the dynamic analysis engine 140, as described below. These software profile(s) may be directed to different software or different versions of the same software application extracted from software image(s) fetched from storage device 255.

In some embodiments, although not shown, network interface 234 may be contained within the first MCD system $210_1$. In other embodiments, the network interface 234 can be integrated into an intermediary device in the communication path (e.g., a firewall, router, switch or other networked electronic device) or can be a standalone component, such as an appropriate commercially available network tap.

As further shown in FIG. 2A, the first MCD system $210_1$ comprises static analysis engine 120, an optional emulation engine 125, a scheduler 250, storage device 255, dynamic analysis engine 140, classification engine 160, and reporting logic 170. Herein, the static analysis engine 120 may include one or more software modules that, when executed by one or more processors, analyzes characteristics for objects within an incoming flow, which may be a portion of network traffic according to this embodiment of the disclosure. Such analysis may involve a static analysis of the characteristics of each object under analysis using a variety of checks that are conducted without executing the object. Examples of the checks may include signature matching, heuristics, determinative rule-based analysis, blacklist checking, whitelist checking, or the like.

In general, referring still to FIG. 2A, the static analysis engine 120 is communicatively coupled to receive network traffic such as a series of HTTP messages. The static analysis engine 120 comprises a filter logic 245 that parses the incoming network traffic, where the static analysis engine 120 conducts static analysis of one or more objects within the network traffic (flow), and may store the information associated with objects that appear "suspect" in that these objects exhibit characteristics associated with malware.

When implemented, a score determination logic 247 may be configured to determine a probability (or level of confidence) that the suspect object 130 is part of a malicious attack. More specifically, based on the static analysis, the score determination logic 247 may be configured to a value (referred to as a "static analysis score") that may be used to identify a likelihood that the suspect object 130 is part of a malicious attack.

After analysis of objects within the flow, the static analysis engine 120 may route one or more "suspect" objects (e.g., suspect 130) to the dynamic analysis engine 140, which is configured to provide more in-depth analysis by analyzing the behavior of the suspect object 130 in a VM-based operating environment. Although not shown, the suspect object 130 may be buffered by a data store until ready for processing by virtual execution logic 260.

More specifically, after analysis of the characteristics of the suspect object 130 has been completed, the static analysis engine 120 may provide some or all of the suspect object 130 to the dynamic analysis engine 140 for in-depth dynamic analysis by one or more virtual machines (VMs) $267_1$-$267_M$ (M≥1) of the virtual execution logic 260. For instance, the virtual execution logic 260, operating in combination with processing logic 270 (described below), is adapted to simulate the transmission and/or receipt of signaling by a destination device represented by VM $267_1$. Of course, if the object under analysis is not suspected of being part of a malicious attack, the static analysis engine 120 may simply denote that the object is benign and refrain from passing the object to the dynamic analysis engine 140 for analysis.

According to one embodiment, the scheduler 250 may be adapted to configure the VMs $267_1$-$267_M$ based on metadata associated with the flow received by the static analysis engine 120. For instance, the VMs $267_1$-$267_M$ may be configured with software profiles corresponding to the software images stored within storage device 255. As an alternative embodiment, the VMs $267_1$-$267_M$ may be configured according to one or more software configurations that are being used by electronic devices connected to a particular enterprise network (e.g., client device 230) or prevalent types of software configurations (e.g., a Windows® 7 OS; Internet Explorer® (ver. 10) web browser; Adobe® PDF™ reader application). As yet another alternative embodiment, the VMs $267_1$-$267_M$ may be configured to support concurrent virtual execution of a variety of different software configurations in efforts to verify that the suspect object is part of a malicious attack (e.g., reconnaissance operations, entry-point testing, exploit, etc.). Of course, it is contemplated that the VM configuration described above may be handled by logic other than the scheduler 250.

According to one embodiment of the disclosure, the dynamic analysis engine 140 is adapted to execute one or more VMs $267_1$-$267_M$ to simulate the receipt and execution of content associated with the suspect object 130 within a run-time environment as expected by the type of object. For instance, dynamic analysis engine 140 may optionally include processing logic 270 to emulate and provide anticipated signaling to the VM(s) $267_1$, . . . , and/or $267_M$ during virtual processing.

For example, the processing logic 270 may be adapted to provide, and sometimes modify (e.g., modify IP address, etc.) packets associated with the suspect object 130 in order to control return signaling back to the virtual execution environment 265. Hence, the processing logic 270 may suppress (e.g., discard) the return network traffic so that the return network traffic is not transmitted to the communication network 232. According to one embodiment of the disclosure, for a particular suspect object 130 being multiple related flows such as TCP or UDP flows, the processing logic 270 may be configured to send packets to the virtual execution environment 265 via a TCP connection or UDP session. Furthermore, the processing logic 270 synchronizes return network traffic by terminating the TCP connection or UDP session.

As further shown in FIG. 2A, the monitoring logic 275 within the virtual execution logic 260 may be configured to monitor behaviors of one or more VMs $267_1$, . . . , and/or $267_M$, such as VM $267_1$ that is responsible for executing the suspect object 130. This monitoring is conducted to detect anomalous activity indicative that the suspect object 130 is part of a malicious attack. When anomalous activity is detected, the monitoring logic 275 operating with an optional score determination logic 277 may route the VM-based results 150 (e.g., computed score, information associated with the detected anomalous behaviors, and other information associated with the detected malicious activity by the suspect object 130) to classification engine 160.

It is noted that the score determination logic 277 may not be implemented within the dynamic analysis engine 140 so that the VM-based results 150 exclude any scores, but rather includes information associated with the detected anomalous behaviors that are analyzed by the monitoring logic 275. The VM-based results 150 are subsequently weighted by the prioritization logic 280 and analyzed by the score determination logic 282 implemented within the classification engine 160.

According to one embodiment of the disclosure, the classification engine 160 may be configured to receive the static analysis results 122 and/or the VM-based results 150. According to one embodiment of the disclosure, the classification engine 160 comprises prioritization logic 280 and score determination logic 282. The prioritization logic 280 may be configured to apply weighting to results provided from dynamic analysis engine 140 and/or static analysis engine 120. These results may be (1) a "dynamic analysis score" produced by score determination logic 277 and/or "static analysis score" produced by score determination logic 247 or (2) anomalous behaviors detected by monitoring logic 275.

The score determination logic 282 comprises one or more software modules that are used to determine a final probability as to whether the suspect object is part of a malicious attack, and the resultant (final) score representative of this final probability may be included as part of results provided to alert/report generation logic 290 within reporting logic 170. Where the score determination logic 282 has failed to determine that the suspect object 130 is malicious based on the static analysis results 122 (e.g., static analysis score, etc.) and/or the VM-based results 150 (e.g., dynamic analysis score, etc.), the classification engine 160 may refrain from providing the results to alert/report generation logic 290 or the results can be provided to alert/report generation logic 290 for processing to denote no malicious attack has been detected.

As another part of the results provided to the reporting logic 170, information within the VM-based results 150, static analysis results 122, and/or results 128 from operations on emulation engine 125 (or any derivation thereof) may be included as part of the feedback 190 provided to management system 220. Such information may include anomalous behaviors, matched signature patterns, or the like. A parameter generator 222 is configured to receive the feedback information 190 and generate a configuration file having one or more parameter values that may be used to add (or enable), modify or disable one or more of the static analysis rules 123, the emulation rules 126, the dynamic analysis rules 142, and/or the classification rules 162.

As illustrative embodiment of the disclosure, based on information within feedback 190 (also represented by "message(s)"), the parameter generator 222 generates a configuration file that includes a parameter value for modifying a dynamic analysis rule in order to activate or disable a monitor responsible for monitoring a particular type of API call, requested access to a certain port number. In another illustrative embodiment, the parameter value may be configured to alter the number and/or types of monitors in operation within the monitoring logic 275 of the dynamic analysis engine 140. Similarly, the parameter value may specify a particular type, pattern or combination of observed behaviors to be activated as these behaviors may be associated with malicious attacks that are currently being detected by other MCD systems communicatively coupled to the management system 220.

As another illustrative embodiment of the disclosure, based on information within feedback message(s) 190, the parameter generator 222 generates a configuration file that includes a parameter value for modifying a particular classification rule 162 so as to modify the object classification process. For instance, the parameter value may be a weighting that is uploaded into the prioritization logic 280. This weighting adjusts the amount of consideration in the static analysis score and/or the dynamic analysis score that is used by the score determination logic 282 in producing the final score. The final score represents the suspect object as malicious when the score is equal to or exceeds a prescribed score threshold. The score threshold also may be dynamically set by parameter generator 222 based on feedback 190.

As yet another illustrative embodiment of the disclosure, based on information within feedback message(s) 190, the parameter generator 222 generates a configuration file that includes a parameter value for modifying a static analysis rule 123. For instance, the parameter value may add or delete a characteristic considered during static analysis to determine if an object under analysis is suspicious.

As another illustrative embodiment of the disclosure, based on information within feedback message(s) 190, the parameter generator 222 generates a configuration file that includes a parameter value that modifies an emulation rule 126. For instance, the parameter value may modify which function associated with the emulation (e.g., a particular APIs, etc.) to "hook" to more in-depth analysis of the behaviors associated with emulated processing of the hooked function.

Figure 2B:
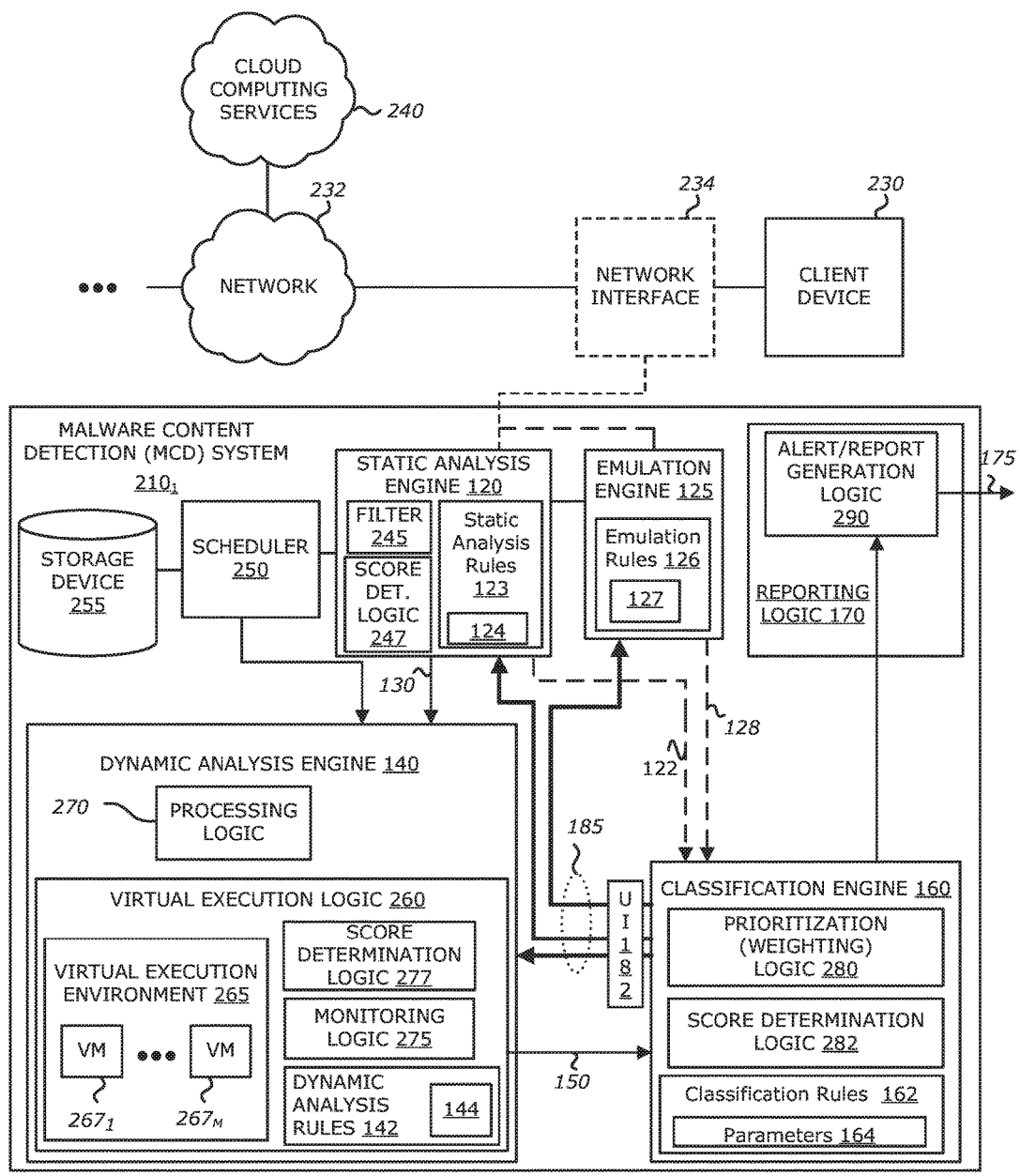
FIG. 2B is a second exemplary block diagram of a communication system utilizing a local update path for configuration of one or more detection engines in accordance with FIG. 1B.
Figure 2C:
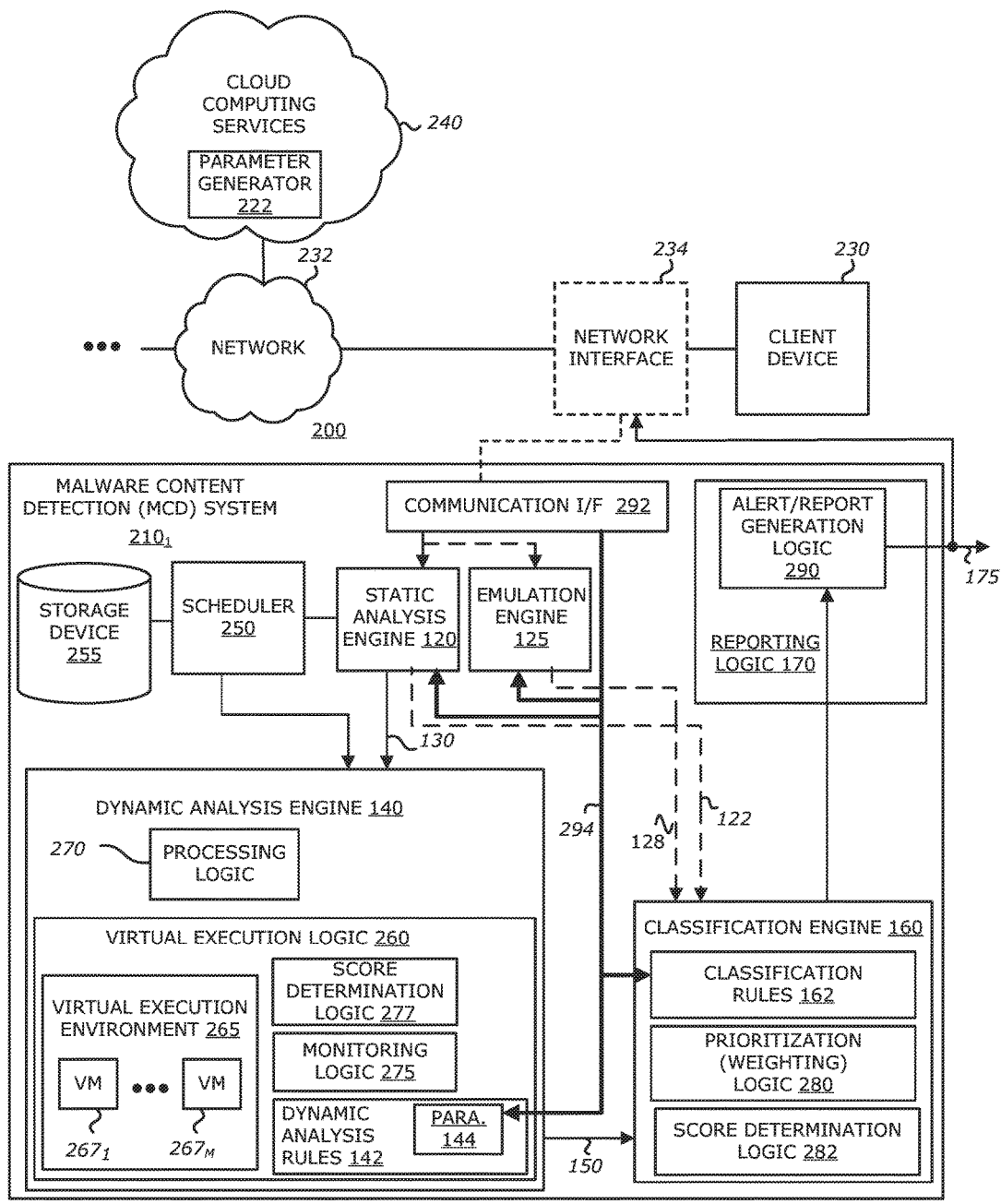
FIG. 2C is a third exemplary block diagram of the communication system with an in-line MCD system adapted for detecting a malicious attack based on analysis of a suspect object by a configurable static analysis engine, a configurable dynamic analysis engine and/or a configurable emulation engine.

As an alternative, as shown in FIG. 2B, it is contemplated that similar operations may be conducted locally by logic within the MCD system $210_1$ in lieu of remotely by management system 220 as illustrated in FIG. 2A. According to this embodiment, the parameter generator 222 may be implemented within the classification engine 160 (as shown), user interface 182, and/or reporting logic 170 to control parameter/rule settings via local update paths 185 based, at least in part, on the static results 122, emulation results 128 and/or the VM-based results 150.

Of course, in lieu of certain aspects of the static analysis being conducted by MCD systems $210_1$, it is contemplated that cloud computing services 240 may be implemented to handle such analysis. Additionally or in the alternative, cloud computing services 240 may be configured with virtual execution logic 260 that conducts virtual execution of the suspect object 130, as described herein. In accordance with this embodiment, MCD system $210_1$ may be adapted to establish secured communications with cloud computing services 240 for exchanging information.

Referring now to FIG. 2C, the first MCD system $210_1$ may be coupled with the communication network 232 in line with client device 230. Contrary to the embodiment illustrated in FIG. 2A, the first MCD system $210_1$ comprises an communication interface 292, which may be used to route content updates from the parameter generator 222 to the static analysis engine 120, the emulation engine 125, the dynamic analysis engine 140 and/or the classification engine 160 via feedback transmission medium 294. Hence, depending on the information provided from reporting logic 170 that is received by cloud computing service 240, such as detected anomalous behaviors or the like, the cloud computing services 240 may provide one or more configuration files including parameter values that changes the analysis conducted by the static analysis engine 120, the emulation engine 125, the dynamic analysis engine 140 and/or the classification engine 160, as described above.

V. Exemplary Logic Layout of a MCD System

Figure 3:
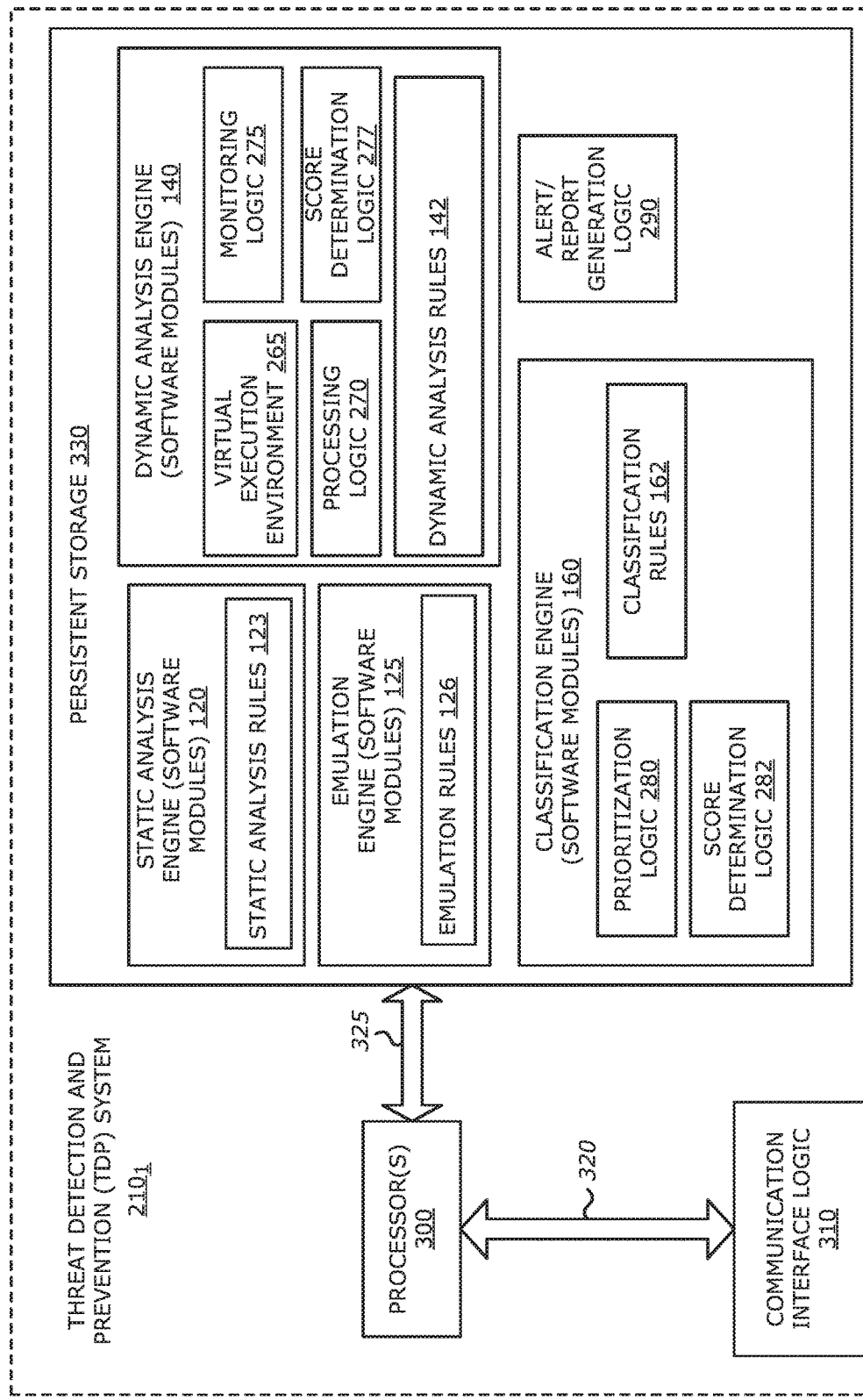
FIG. 3 is an exemplary logic representation of the MCD system of FIGS. 2A-2B.

Referring now to FIG. 3, an exemplary logical representation of the MCD system $210_1$ of FIGS. 2A-2B is shown. MCD system $210_1$ comprises one or more processors 300 that are coupled to communication interface logic 310 via a first transmission medium 320. Communication interface logic 310 enables communications with other MCD systems $210_2$-$210_3$ and management system 220 of FIG. 2A-2B. According to one embodiment of the disclosure, communication interface logic 310 may be implemented as a physical interface including one or more ports for wired connectors. Additionally, or in the alternative, communication interface logic 310 may be implemented with one or more radio units for supporting wireless communications with other electronic devices.

Processor(s) 300 is further coupled to persistent storage 330 via transmission medium 325. According to one embodiment of the disclosure, persistent storage 330 may include (a) static analysis engine 120 that comprises static analysis rules 123, filter logic 245 and score determination logic 247; (b) emulation engine 125 that includes emulation rules 126; (c) the dynamic analysis engine 140 that comprises virtual execution environment 265, processing logic 270, the monitoring logic 275, score determination logic 277 and/or dynamic analysis rules 142; (d) classification engine 160 including prioritization logic 280, score determination logic 282, and/or classification rules 162; and (e) alert report/generation logic 290. Of course, when implemented as hardware, one or more of these logic units could be implemented separately from each other. Some of the logic stored within the persistent storage 330 is described below.

The filter logic 245 comprises one or more software modules that parses the incoming flow to allow the static analysis engine 120 to conduct static analysis of one or more objects within the flow, and stores/upload the information associated with "suspect" objects that exhibit characteristics associated with malware.

Score determination logic 247 operates to produce the static analysis score that is provided to the classification engine 160. The static analysis score may be utilized by the classification engine 160 in determining if the suspect object is part of a malicious attack.

Static analysis rules 123 are the rules that control operations of the status analysis engine 120. At least some of the status analysis rules 123 may be modified by altering one or more parameters associated with these rules. The parameter values may be used to effectively add, disable or modify certain rules, and thus, the static analysis operations conducted by the static analysis engine 120.

The virtual execution environment 265 comprises one or more software modules that are used for performing an in-depth, dynamic and/or real-time analysis of the suspect object using one or more VMs. More specifically, the virtual execution environment 265 is adapted to run the VM(s), which virtually process the content associated with the suspect object by simulating receipt and execution of such content in order to generate various activities that may be monitored by the monitoring logic 275.

The monitoring logic 275 monitors behaviors during virtual processing of the suspect object in real-time and may also log at least anomalous behaviors by the VM(s) configured with certain software and operability that are presumably targeted by the malicious attack. In essence, the monitoring logic 275 identifies the effects that the suspect object would have had on a client device with the same software/feature configuration. Such effects may include unusual network transmissions, unusual changes in performance, and the like.

Thereafter, according to the observed behaviors of the virtually executed object that are captured by the monitoring logic 275, the score determination logic 277, when deployed within the dynamic analysis engine 140, determines whether the suspect object is associated with a malicious attack. This may be accomplished by analysis of the severity of the observed anomalous behaviors and/or the likelihood of the anomalous behaviors result from a malicious attack, is evaluated and reflected in the dynamic analysis score. As a result, the score determination logic 277 at least partially contributes to the VM-based results 150 for use by classification engine 160.

Dynamic analysis rules 142 are the rules that control operations of the dynamic analysis engine 140. At least some of the dynamic analysis rules 140 may be modified by altering one or more parameters associated with these rules. The parameter values may be used to effectively add, disable or modify certain rules, and thus, monitoring, scoring and other operations with the dynamic analysis engine 140 may be modified in efforts to reduce false positives and/or false negatives.

Emulation rules 126 are the rules that control operations of the emulation engine 125. At least some of the emulation rules 126 may be modified by altering one or more parameters associated with these rules. The parameter values may be used to effectively add, disable or modify certain rules, and thus, emulation by the emulation engine 125 of operations conducted on a particular object and subsequent monitoring for anomalous behavior. Such monitoring may involve "hooking" certain function calls associated with the suspect object and controlling what data is specifically returned in response to corresponding function calls.

The prioritization logic 280 comprises one or more software modules that are used for weighting information associated with VM-based results 150 (e.g., dynamic analysis score) and/or static analysis results 122 (e.g., static analysis score). For instance, the prioritization logic 280 may assign a higher priority (and larger weight) to either the VM-based results 150 or the static analysis results 122. For instance, the static analysis score generated by the score determination logic 247 and the dynamic analysis score generated by the score determination logic 277 may be weighted differently so that one of these scores is given a higher priority than the other. Alternatively, if implemented to receive the anomalous characteristics and behaviors as part of VM-based results 150 and/or static analysis results 122, the prioritization logic 280 may be configured to apply different weights to different anomalous characteristics or behaviors.

The score determination logic 282 may be adapted to receive both the VM-based results 150 and static analysis results 122 along with weighting provided by prioritization logic 280. Based on these results, the score determination logic 282 generates a "final score" that signifies whether the suspect object is determined to be part of a malicious attack (e.g., an exploit) or benign.

Alternatively, the score determination logic 282 may be adapted to receive the VM-based results 150 along with weighting provided by prioritization logic 280 and, based on the score and/or observed anomalous behaviors, generates the "final score" that signifies whether the suspect object is determined to be part of a malicious attack (e.g., an exploit) or benign.

Classification rules 162 are the rules that control operations of the classification engine 160. At least some of the configuration rules 162 may be modified by altering one or more parameter values associated with these rules. The parameter values may be used to effectively add, disable or modify certain rules, and thus, the operations for classifying subject objects after analysis by one or more of the static analysis engine 120, emulation engine 125 and/or dynamic analysis engine 140 may be modified in efforts to reduce false positives and/or false negatives.

Continuing the above example, processor(s) 300 may invoke alert report/generation logic 290, which produces alerts which may include a detailed summary of information associated with a detected malicious attack, such as an exploit detected by the MCD system 210$_1$.

VI. Exemplary Configuration of the Dynamic Analysis

Figure 4:
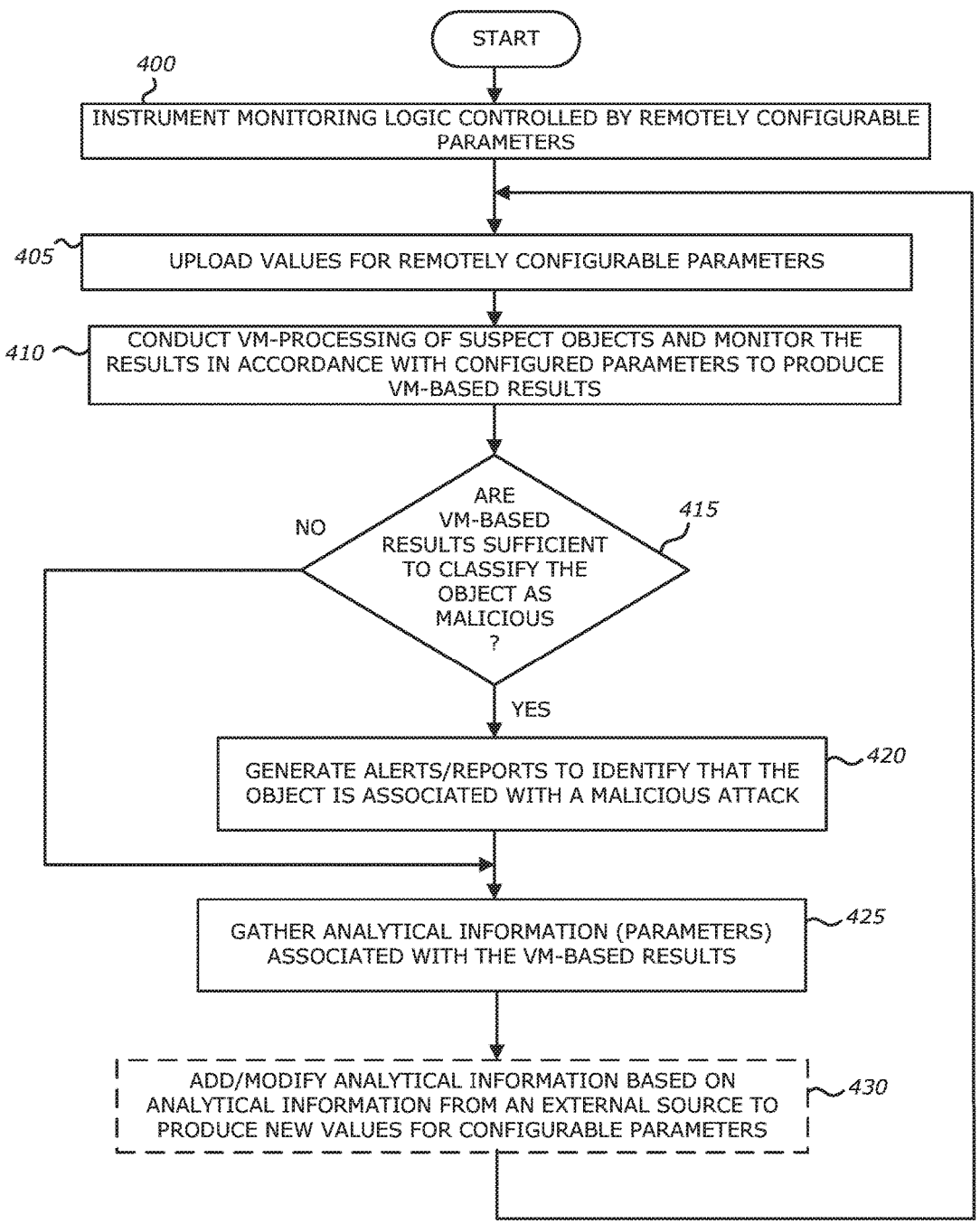
FIG. 4 is a general exemplary flowchart illustrating a dynamic analysis process with software configurable monitoring logic within a dynamic analysis engine.

Referring to FIG. 4, a general exemplary flowchart illustrating the software configuration of monitoring logic involved with dynamic analysis of suspect objects within the dynamic analysis engine is shown. First, the monitoring logic that is controllable by remotely configurable parameters is instrumented (block 400). Thereafter, as illustrated in block 405, the remotely configurable parameter(s) within software that controls the monitoring logic are modified with corresponding parameter value(s). These parameter value(s) are selected to modify operations of the monitoring logic based on information from a prior malware detection analysis (e.g., static analysis, dynamic analysis, emulation, and/or classification). The modification of remotely configurable parameter(s) is conducted to reduce the number or rate of false positives and/or false negatives. For instance, the parameter value(s) may be set to activate monitors that are directed to monitor communications associated with a certain API during VM-based operations where such monitored information will improve the accuracy of the VM-based results.

Subsequent to the configurable parameter(s) associated with the monitoring logic being altered, the VM execution logic awaits receipt of the next suspect object for dynamic analysis, and upon receipt, conducts VM-based processing on the suspect object and monitors the results in accordance with the configured parameter(s), as set forth in block 410. Based on at least the VM-based results, a determination is made as to whether the VM-results are sufficient to classify the suspect object as part of a malicious attack (block 415). If so, alerts or reports may be generated to identify the suspect object is associated with a malicious attack (block 420).

Regardless of the determination as to whether the suspect object may be classified as part of a malicious attack or not, analytical information (e.g., current parameter values associated with monitoring logic, etc.) associated with the VM-based results is gathered (block 425). This analytical information is used to determine the current operating state of the dynamic analysis engine. As a result, based on a desired change in the operating state of the dynamic analysis engine, the analytical information provides a base reference from which certain parameter(s) may be selected for modification using a configuration file in order to add, modify or disable functionality within the dynamic analysis engine (block 430).

In the foregoing specification, embodiments of the disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus comprising:
a processor; and
a memory communicatively coupled to the processor, the memory has stored thereon a first detection logic including software that is configurable to enable, disable or modify analysis capabilities of the first detection logic, wherein the first detection logic, when executed by the processor, conducts a first analysis of a received object to determine if the received object is associated with a malicious attack,
wherein the first detection logic receives a configuration file, the configuration file being automatically generated by a parameter generation logic including second software to automatically generate the configuration file based on a result of the first analysis,
wherein the capabilities of the first detection logic are altered based on the configuration file, the first detection logic, after alteration of the capabilities, performs a second analysis on the received object or a second received object, the second analysis being different than the first analysis and configured to detect characteristics or behaviors associated with the malicious attack that are used to classify the received object or the second received object as malware, wherein the configuration file modifies a weighting of at least one of a first analysis score being at least part as the result of the first analysis or a second analysis score being at least part of a result of the second analysis as used in classifying the received object or the second received object as malware.

2. The apparatus of claim 1, wherein the first detection logic includes parameters that control operability of one or more rules for use in the analysis of the received object for malware, a first subset of the parameters being modifiable based on the result of the first analysis.

3. The apparatus of claim 2, wherein the first detection logic includes a first plurality of rules for controlling monitoring logic, the first detection logic, when executed by the processor, conducts the analysis of the received object by (i) one or more virtual machines processing the received object and (ii) the monitoring logic monitoring behaviors of the received object during processing by the one or more virtual machines so as to detect one or more anomalous behaviors from the monitored behaviors,
 wherein the configuration file alters the first subset of the parameters to change the one or more rules of the first plurality of rules so as to change operability of the monitoring logic.

4. The apparatus of claim 3, wherein the configuration file alters the first subset of the parameters so as to alter which monitors forming the monitoring logic are in operations during the analysis of the received object by the first detection logic.

5. The apparatus of claim 3, wherein the configuration file alters the first subset of the parameters so as to change at least one of (i) a number or type of behaviors to be monitored by the monitoring logic or (ii) signature patterns associated with one or more behaviors being monitored by the monitoring logic.

6. The apparatus of claim 2, wherein the configuration file alters the first subset of the parameters so as to change at least one of (1) a number or type of signatures for signature matching conducted during the analysis of the received object by the first detection logic, (2) a number or type of characteristics to be monitored during the analysis of the received object by the first detection logic, or (3) a maximum or minimum time for the analysis of the received object by the first detection logic.

7. The apparatus of claim 1, wherein the configuration file alters what data is to be returned to the first detection logic in response to the intercepted function calls set by the configuration file during the analysis of the received object by the first detection logic.

8. The apparatus of claim 1, wherein the first detection logic is software that is configurable and includes a first plurality of rules of one or more rules for controlling a comparison of content within the received object with a first set of signature patterns associated with known malware of a plurality of signature patterns preloaded into the first detection logic,
 wherein the configuration file at least deactivates one or more of the first set of signature patterns or activates one or more of the plurality of signature patterns different than the first set of signature patterns to prior to performance of the second analysis without reloading of the software associated with the first detection logic.

9. The apparatus of claim 1, wherein the configuration file is uploaded via a user interface communicatively coupled to the one or more detection logic.

10. The apparatus of claim 1, wherein the memory has stored thereon a second detection logic that operates as a dynamic analysis engine including (i) one or more virtual machines that process the received object or (ii) monitoring logic that monitors behaviors of the received object during processing by the one or more virtual machines so as to detect one or more anomalous behaviors from the monitored behaviors and the configuration file alters one or more parameters associated with dynamic analysis rules to change operation of the monitoring logic for analysis of objects subsequent to the received object for the malware.

11. The apparatus of claim 1, further comprising:
 a second detection logic that operates as a static analysis engine that conducts an analysis of characteristics of the received object without processing of the received object, and the configuration file alters one or more parameters associated with static analysis rules to change operations of the static analysis rules, the change in operation includes a change in how the received object is evaluated in determining whether the object exhibits characteristics associated with the malicious attack.

12. The apparatus of claim 1, wherein the first detection logic operates as a classification engine that classifies the received object as potentially malicious or not based on results from one or more of a dynamic analysis engine, a status analysis engine or emulation engine, and the configuration file alters one or more parameters associated with classification rules that control operability of the classification engine.

13. The apparatus of claim 1, wherein generation of the configuration file based on a result of the first analysis includes use of machine learning techniques.

14. The apparatus of claim 1, wherein the altering the parameters of the monitoring logic further includes modifying (i) types of the behaviors of the object being monitored or (ii) patterns or combinations of observed behaviors that are associated with the malicious attack.

15. A method for altering operability of a malware content detection system, comprising:
 conducting a first analysis of an object for malware, the first analysis including monitoring behaviors of the object being processed within a virtual machine;
 determining whether results of the first analysis of the object are sufficient to classify the object as part of a malicious attack;
 generating an alert in response to the results of the first analysis of the object being sufficient to classify the object as part of a malicious attack; and
 responsive to determining that results of the analysis of the object are insufficient to classify the object as part of the malicious attack, (1) receiving an automatically generated configuration file based on the results of the first analysis, and (2) altering parameters of monitoring logic that controls operability of one or more rules controlling a second analysis of the object for a presence of malware,
 wherein the parameters of the monitoring logic are altered based on the configuration file, and wherein the altering includes adjusting a weighting of at least one of a first analysis score being at least part of the results of the first analysis or a second analysis score being at least part of results of the second analysis that are used in classifying the object as being part of a malicious attack.

16. The method of claim 15, wherein the configuration file alters a first subset of the parameters so as to alter which monitors forming the monitoring logic are in operation during the analysis of the object for the malware.

17. The method of claim 15, wherein the configuration file alters a first subset of the parameters so as to change a number or type of behaviors to be monitored by the monitoring logic.

18. The method of claim 15, wherein the configuration file alters a first subset of the parameters so as to change one or more signature patterns associated the behaviors being monitored by the monitoring logic.

19. The method of claim 15, wherein the configuration file alters a first subset of the parameters so as to change a maximum or minimum time for the analysis of the received object for the malware.

20. The method of claim 15, wherein generation of the configuration file based on a result of the first analysis includes use of machine learning techniques.

21. The method of claim 15, wherein altering the capabilities of the first detection logic includes modifying (i) types of the behaviors of the object being monitored or (ii) patterns or combinations of observed behaviors that are associated with the malicious attack.

* * * * *